United States Patent
Luo et al.

(10) Patent No.: US 10,983,498 B2
(45) Date of Patent: Apr. 20, 2021

(54) CALIBRATION METHOD OF DETECTION DEVICE, AND METHOD FOR ACQUIRING CALIBRATION FILE OF DETECTION DEVICE

(71) Applicant: CLOUDMINDS (SHENZHEN) ROBOTICS SYSTEMS CO., LTD., Shenzhen (CN)

(72) Inventors: Lei Luo, Beijing (CN); Wei Yang, Beijing (CN); Taotao Mu, Beijing (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/324,320

(22) PCT Filed: Dec. 29, 2017

(86) PCT No.: PCT/CN2017/120214
§ 371 (c)(1),
(2) Date: Feb. 8, 2019

(87) PCT Pub. No.: WO2019/127497
PCT Pub. Date: Jul. 4, 2019

(65) Prior Publication Data
US 2020/0379426 A1   Dec. 3, 2020

(51) Int. Cl.
*G05B 19/401* (2006.01)
*H04L 29/08* (2006.01)

(52) U.S. Cl.
CPC ........... *G05B 19/401* (2013.01); *H04L 67/06* (2013.01); *H04L 67/125* (2013.01); *G05B 2219/36518* (2013.01)

(58) Field of Classification Search
CPC ...... G05B 19/401; H04L 67/06; H04L 67/125
(Continued)

(56) References Cited

U.S. PATENT DOCUMENTS

2004/0055359 A1* 3/2004 Ketler ............... G01N 33/0006
73/1.07
2008/0049013 A1* 2/2008 Nasle ............... H02J 13/00017
345/419
(Continued)

FOREIGN PATENT DOCUMENTS

| CN | 101534224 A | 9/2009 |
|----|-------------|--------|
| CN | 103336696 A | 10/2013 |
| CN | 103942305 A | 7/2014 |

OTHER PUBLICATIONS

Written Opinion issued in corresponding International Application No. PCT/CN2017/120214, dated Jul. 27, 2018 (13 pages).

(Continued)

*Primary Examiner* — Mohammad Ali
*Assistant Examiner* — Joshua T Sanders
(74) *Attorney, Agent, or Firm* — Osha Bergman Wantanabe & Burton LLP

(57) ABSTRACT

A calibration method of a detection device and a method for acquiring a calibration file of the detection device are described herein. The acquisition method includes generating the calibration file in an address space accessible by the detection device in a use environment according to a calibration result, and correspondingly storing a unique identification code, the calibration result, and the calibration file of each detection device. When the detection device detects an article, the method includes attempting to acquire the calibration file from itself. If the calibration file can be acquired, the method includes directly loading the calibration file. If the calibration file cannot be acquired, the method includes acquiring the calibration file from the address space accessible by the detection device in the use environment. The solution is applied to the calibration of the detection device on a production line and the use of the detection device.

5 Claims, 3 Drawing Sheets

(58) Field of Classification Search
USPC .......................................................... 700/28
See application file for complete search history.

(56) References Cited

U.S. PATENT DOCUMENTS

2014/0074421 A1* 3/2014 Yin ...................... G01D 18/004
                                                              702/104
2017/0262816 A1* 9/2017 Furihata ................. G06Q 10/20

OTHER PUBLICATIONS

The First Office Action issued in corresponding Chinese Application No. 201780002649.9, dated Jun. 4, 2019 (21 pages).

* cited by examiner

CALIBRATION METHOD OF DETECTION DEVICE, AND METHOD FOR ACQUIRING CALIBRATION FILE OF DETECTION DEVICE

CROSS-REFERENCE TO RELATED APPLICATIONS

This application claims the benefit of PCT application No. PCT/CN2017/120214 filed on Dec. 29, 2017, the contents of which are incorporated herein by reference.

FIELD OF THE INVENTION

The present invention relates to the technical field of detection devices, and in particular, to a calibration method of a detection device and a method for acquiring a calibration file of the detection device.

BACKGROUND OF THE INVENTION

The existing professional detection devices are basically stand-alone devices, that is, offline devices that cannot be connected to the Internet. Before leaving the factory, the detection devices need to be calibrated on the production line, and the general process of calibration is as follows: firstly, the detection device detects a standard operation of a standard article in a standard environment, the obtained detection result is the calibration result of the calibration of the detection device, a calibration file is generated based on the calibration result, then the calibration file is burned into a memory of the detection device, so that a user can call the calibration file when using the detection device to perform detecting and compensating for the detection result according to the calibration file.

Since each detection device needs to be independently calibrated by using the same calibration method described above, the time overhead is relatively long. Moreover, a part of the detection devices even needs to write the calibration files from dedicated interfaces on circuit boards, which means that the work of writing the calibration files is in the middle of the production line, resulting in cumbersome operations and reduced production efficiency.

In addition, if the calibration file in the detection device is accidentally deleted for various reasons, the detect on device cannot compensate for the detection result, thereby affecting the use of the user.

SUMMARY OF THE INVENTION

The embodiment of the present invention provides a calibration method of a detection device and a method for acquiring a calibration file of the detection device, in order to solve the problems in the traditional solutions that the calibration time is long and that the calibration file is accidentally deleted to affect the use of the user.

To achieve the above objective, the embodiment of the present invention adopts the following technical solutions:

In a first aspect, the embodiment of the present invention provides a calibration method of a detection device, and the calibration method includes: binding a calibration result of the detection device with a unique identification code of the corresponding detection device and uploading the same to an address space accessible by the detection device in a use environment.

In a second aspect, the embodiment of the present invention provides a calibration apparatus of a detection device, and the calibration apparatus includes: a detection module, used for detecting a standard operation of a standard article in a standard environment, and using the acquired detection result as a calibration result of the corresponding detection device; and an information uploading module, used for binding the calibration result with a unique identification code of the corresponding detection device and uploading the same to an address space accessible by the detection device in a use environment.

In a third aspect, the embodiment of the present invention provides a storage medium, and the storage medium stores instruction codes, and the instruction codes are used for executing the calibration method in the first aspect.

In a fourth aspect, the embodiment of the present invention provides a computer program, and the computer program includes instruction codes, and the instruction codes are used for executing the calibration method in the first aspect.

In a fifth aspect, the embodiment of the present invention provides a method for acquiring a calibration file of a detection device, and the acquisition method includes the following steps: S1': receiving and storing a calibration result of each detection device on a production line and a unique identification code thereof, generating a calibration file of the corresponding detection device according to the calibration result, and storing the calibration file; and S2': receiving a calibration file acquisition request sent by the detection device and carrying the unique identification code thereof, searching for the calibration file of the detection device according to the unique identification code, and returning the searched calibration file to the detection device.

In a sixth aspect, the embodiment of the present invention provides a network side apparatus for acquiring a calibration file of a detection device, and the network side apparatus includes: a storage module, used for receiving and storing a calibration result of each detection device on a production line and a unique identification code thereof, generating a calibration file of the corresponding detection device according to the calibration result, and storing the calibration file; and a searching module, used for receiving a calibration file acquisition request sent by the detection device and carrying the unique identification code thereof, searching for the calibration file of the detection device according to the unique identification code, and returning the searched calibration file to the detection device.

In a seventh aspect, the embodiment of the present invention provides a storage medium, and the storage medium stores instruction codes, and the instruction codes are used for executing the acquisition method in the fifth aspect.

In an eighth aspect, the embodiment of the present invention provides a computer program, and the computer program includes instruction codes, and the instruction codes are used for executing the acquisition method in the fifth aspect.

In a ninth aspect, the embodiment of the present invention provides a method for acquiring a calibration file of a detection device, and the acquisition method includes the following steps: S1''; attempting to acquire a calibration file thereof from the detection device before detecting the article, if the calibration file cannot be acquired, entering step S2''; if the calibration file can be acquired, entering step S4''; S2''; sending a calibration file acquisition request carrying a unique identification code of the detection device to an address space accessible by the detection device in a use environment; S3''; receiving the calibration file returned by the address space for the calibration file acquisition request, and entering step S4"; and S4"; loading the calibration file.

In a tenth aspect, the embodiment of the present invention provides a user side apparatus for acquiring a calibration file of a detection device, and the user side apparatus includes: an acquisition module, used for attempting to acquire a calibration file thereof from the detection device before detecting the article; a request module used for, when the acquisition module cannot acquire the calibration file from the detection device, sending a calibration file acquisition request carrying a unique identification code of the detection device to an address space accessible by the detection device in a use environment; a receiving module, used for receiving the calibration file returned by the address space for the calibration file acquisition request; and a loading module, used for loading the calibration file.

In an eleventh aspect, the embodiment of the present invention provides a detection device, and the detection device includes the user side apparatus in the tenth aspect.

In a twelfth aspect, the embodiment of the present invention provides a storage medium, and the storage medium stores instruction codes, and the instruction codes are used for executing the acquisition method in the ninth aspect.

In a thirteenth aspect, the embodiment of the present invention provides a computer program, and the computer program includes instruction codes, and the instruction codes are used for executing the acquisition method in the ninth aspect.

Compared with the prior art, in the above technical solutions provided by the embodiment of the present invention, when the detection device on the production line is calibrated, the calibration result of the detection device is bound with the unique identification code of the corresponding detection device and is uploaded to the address space accessible by the detection device in the use environment, that is, the calibration of the detection device is completed. Since the operation of separately burning the calibration file into each detection device is avoided in the process, the production time of the production line is greatly shortened, and the production efficiency is improved.

In the above technical solutions, when the address space accessible by the detection device in the use environment receives the calibration result and the unique identification code bound with the same uploaded in a calibration process of the detection device on the production line, the detection device generates the calibration file according to the calibration result and correspondingly stores the unique identification code, the calibration result and the calibration file of each detection device. When the user uses the detection device to detect the article, the user attempts to acquire the calibration file from the detection device at first, if the calibration file can be acquired, the calibration file is directly loaded to start the normal detection of the article; and if the calibration file cannot be acquired, the calibration file of the detection device is acquired from the information stored in the address space accessible by the detection device in the use environment according to the unique identification code of the detection device, and then the calibration file is loaded to start normal detection of the article. Through the above process, even if the calibration file in the detection device is deleted by mistake, the calibration file can be acquired from the address space accessible by the detection device in the use environment, thereby ensuring the normal use of the user and improving the user experience.

BRIEF DESCRIPTION OF THE DRAWINGS

To illustrate technical solutions in the embodiments of the present invention or in the prior art more clearly, a brief introduction on the accompanying drawings needed in the description of the embodiments or the prior art is given below. Apparently, the accompanying drawings in the description below are merely some of the embodiments of the present invention, based on which other accompanying drawings can be acquired by those of ordinary skill in the art without any creative effort.

DETAILED DESCRIPTION OF THE EMBODIMENTS

Figure 1:
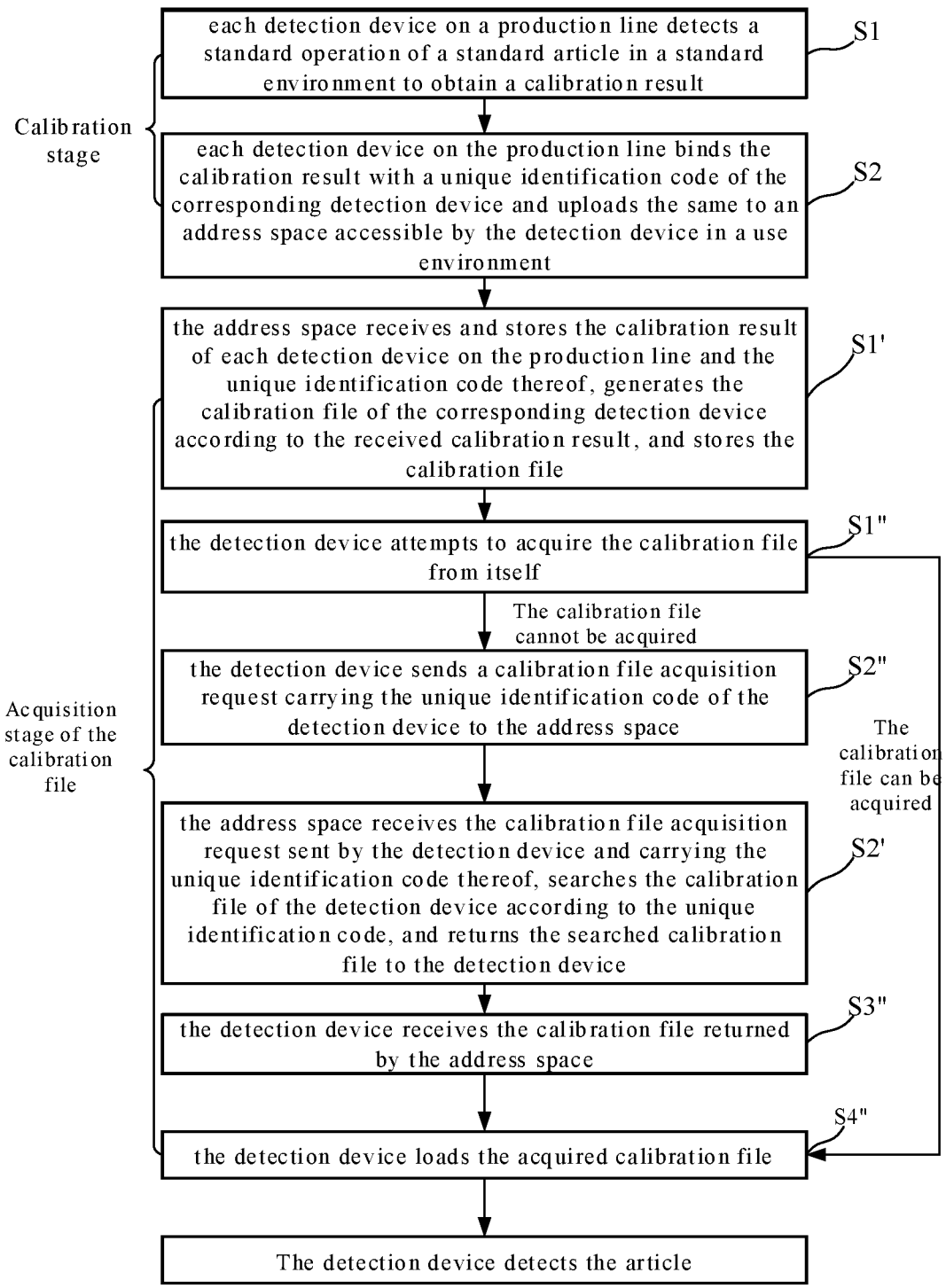
FIG. 1 is a flowchart of a calibration method of a detection device and an acquisition method of a calibration file provided by an embodiment of the present invention.

A clear and complete description of technical solutions in the embodiments of the present invention will be given below, in combination with the accompanying drawings in the embodiments of the present invention. Apparently, the embodiments described below are merely a part, but not all, of the embodiments of the present invention. All of other embodiments, acquired by those of ordinary skill in the art based on the embodiments of the present invention without any creative effort, fall into the protection scope of the present invention.

It can be seen from the background art that, in the prior art, when an article is detected by using a detection device, it is necessary to call and load a calibration file thereof at first, and then normal detection is performed on the article, after the detection, the detection result is compensated according to the calibration file, which can also be called calibration or fine tuning. The calibration file needs to be separately burned into the detection device on the production line before the detection device leaves the factory. This will undoubtedly cause unnecessary waste of production time and reduce the production efficiency. Moreover, during the use of the detection device, once the calibration file is accidentally deleted, the calibration file cannot be loaded, so that the article cannot be detected, and the use of user is affected. In view of the above problems existing in the prior art, the inventors of the present invention have proposed:

When the detection device on the production line is calibrated, the calibration result of the detection device is bound with the unique identification, code of the corresponding detection device and is uploaded to an address space accessible by the detection device in the use environment, that is, the calibration of the detection device is completed.

When the address space accessible by the detection device in the use environment receives the calibration result and the unique identification code bound thereto uploaded by the detection device on the production line, the detection device generates a calibration file according to the calibration result, and correspondingly stores the unique identification code, the calibration result and the calibration file of each detection device.

When the user uses the detection device to detect the article, the detection device attempts to acquire the calibration file from itself at first, the calibration file can be acquired, the calibration file is directly loaded to start the normal detection of the article; and if the calibration file cannot be acquired, the calibration file is acquired from the information stored in the address space accessible by the detection device in the use environment according to the unique identification code of the detection device, and then the calibration file is loaded to start normal detection of the article.

In the above process, since the operation of separately burning the calibration files into each detection device at the calibration stage of the detection device on the production line is avoided, the production time of the production line is greatly shortened, and the production efficiency is improved.

Moreover, the calibration file is acquired by combining the two ways of from the detection device itself and from the address space accessible by the detection device in the use environment, thereby ensuring that even if the calibration file in the detection device is deleted by mistake, the calibration file can be acquired, thus ensuring the normal use of the user, and improving the user experience and the reliability of the detection device.

The above is the inventive concept of the present invention. Based on the above inventive concept, the technical solution of the embodiment of the present invention will be described in detail below.

Figure 2:
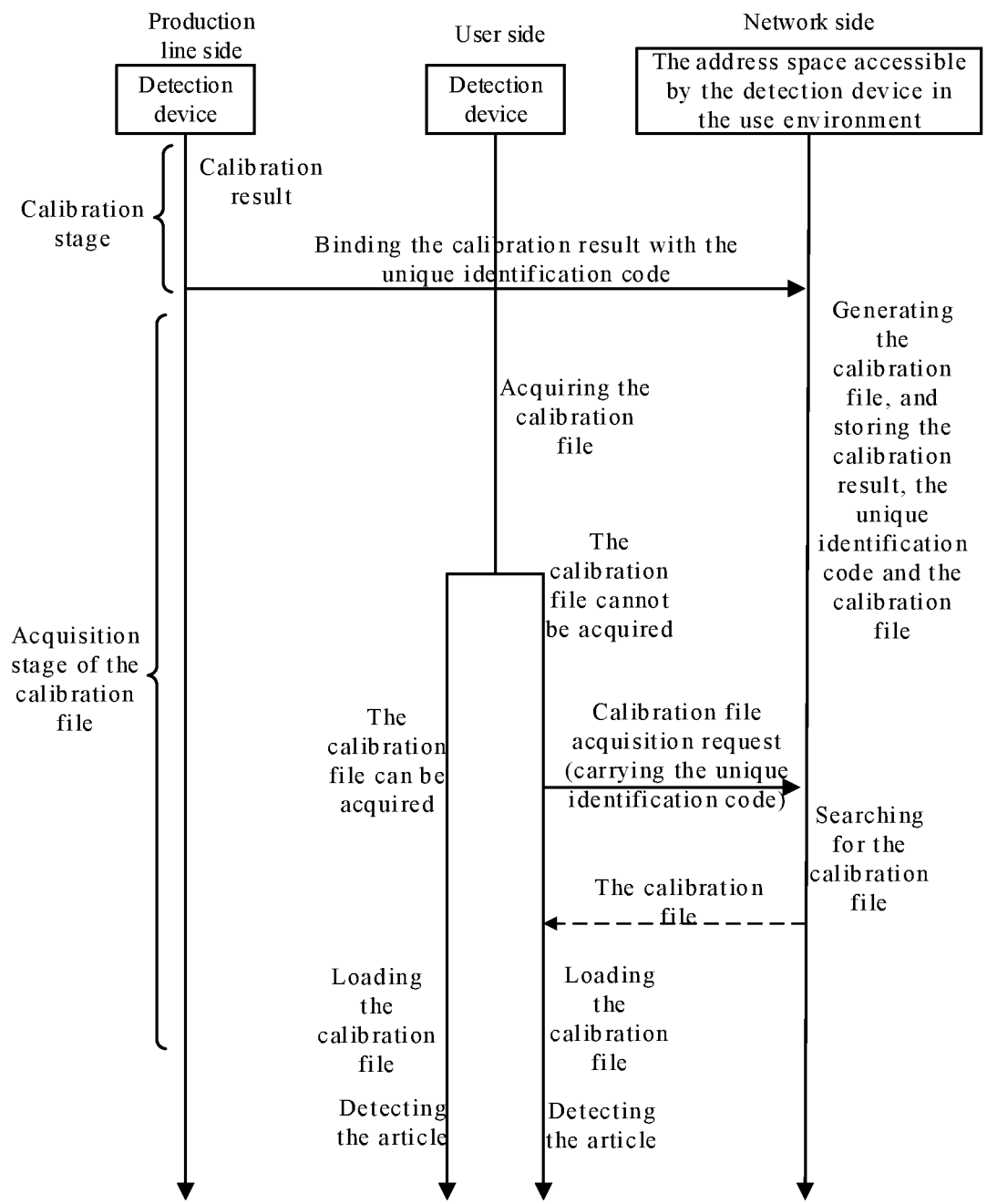
FIG. 2 is an interactive flowchart of a calibration method of a detection device and an acquisition method of a calibration file provided by an embodiment of the present invention.

As shown in FIGS. 1 and 2, the technical solution provided by the embodiment of the present invention includes two stage: (1) a calibration stage of the detection device on the production line; and (2) an acquisition stage of the calibration file of the detection device in a detection process of the article by the user by using the detection device.

In view of the calibration stage of the detection device on the production line, the embodiment of the present invention provides a calibration method of the detection device, and the calibration method is used for calibrating the detection device on the production line before the detection device leaves the factory. Still referring to FIGS. 1 and 2, the calibration method includes the following steps:

S1: on the production line side, the detection device detects a standard operation of a standard article in a standard environment, and the acquired detection result is a calibration result of calibrating the detection device. In the above step S1, since the detection device performs the standardized detection, in the subsequent actual use process of the detection device, the detection result acquired by the standardized detection can be used as the basis for compensating or calibrating the actual calibration result.

Exemplarily, the specific process of the above step S1 can be: testing an ethanol sample by using a specific quartz bottle at a fixed distance, or testing a plastic at a fixed distance in a dark room with light intensity of 1 Lux, and the like.

S2: on the production line side, the detection device binds the calibration result to the unique identification code thereof and uploads the same to the address space accessible by the detection device in the use environment. In the above step S2, the unique identification code of the detection device can be, for example, a number unique to each detection device such as an SN code (Serial Number) of the detection device. The unique identification code be implanted in the detection device on the production line before the step S2.

Since the calibration result and the unique identification code of the bound detection device are uploaded to the address space accessible by the detection device in the use environment, the calibration result and the unique identification code of the specific detection device can be acquired by accessing the address space.

As a possible implementation manner, the calibration result and the unique identification code of the bound detection device can be directly uploaded to the address space accessible by the detection device in the use environment. For example, the address space accessible by the detection device in the use environment can be a cloud server, and the detection device can directly upload to-be-uploaded data to the cloud server. In this manner, it is required that the detection device is based on cloud architecture. As the cloud server has powerful data storage and processing functions, the uploading process is very convenient.

As another possible implementation manner, the calibration result and the unique identification code of the bound detection device can be indirectly uploaded to the address space accessible by the detection device in the use environment. For example, firstly, the calibration result is bound with the unique identification code of the corresponding detection device and is uploaded to a local server, and then the calibration result and the bound unique identification code of the detection device are moved from the local server to the address space accessible by the detection device in the use environment, the address space can be, for example, an address space accessible by an external network. This method is applicable to detection devices having cloud architecture and non-cloud architecture, so that the universality is higher.

In order to upload the data, a calibration application program can be installed in each detection device on the production line before the step S2, and the calibration application program is used for acquiring the calibration result of the corresponding detection device and the unique identification code thereof, binding the calibration result with the unique identification code and uploading the same to a fixed IP address (in the present embodiment, the fixed IP address is the address space accessible by the above detection device in the use environment). After the installation of the calibration application program is completed, the calibration application program needs to be opened, so that the detection device enters a calibration mode, and after the standardized detection is completed, data are uploaded through the calibration application program.

It should be noted that the calibration application program can be directly opened or opened by remote control, and the specific manner can be selected according to actual conditions.

Moreover, in practical applications, the time necessary for mounting the calibration application program in the detection device is short, and the production efficiency is hardly affected. Further, the step of mounting the calibration application program can be compatible with the step of mounting necessary application programs in the inspection device on the production line, so that the necessary for mounting the calibration application program can be further shortened, and no change needs to be performed on the production line.

In addition, after these data such as the calibration result and the unique identification code are uploaded, the calibration work of the corresponding detection device has been substantially completed, and these data do not need to be uploaded subsequently, so the calibration application program for uploading these data can be cleared to save the memory of the detection device and improve the processing speed of the detection device. The operation of clearing the calibration application program can be achieved by the step of restoring the factory settings to shorten the production time.

After the step S2, the production pipeline of the detection device continues to perform, such as: subsequent restoration of the factory settings (which can include the operation of clearing the calibration application program), packaging and the like. After the entire flow is completed, the detection device can leave the factory normally.

Since the calibration file generated according to the calibration result is not stored in the detection device before leaving the factory, the production time is greatly shortened, and the production efficiency of the production line is obviously improved compared with the prior art.

Moreover, since it is not necessary to store the calibration in the detection device before leaving the factory, there is no need to set a corresponding interface for writing the calibration file on the detection device, thereby simplifying the mechanical structure of the detection device.

In view of the acquisition stage of the calibration file of the detection device in the detection process of the article by the user by using the detection device, the embodiment of the present invention provides a method for acquiring the calibration file of the detection device. Still referring to FIGS. 1 and 2, the method for acquiring the calibration file of the detection device includes the following steps:

S1': on a network side, the address space accessible by the detection device in the use environment receives and stores the calibration result and the unique identification code thereof of each detection device on the production line, generates the calibration file of the corresponding detection device according to the received calibration result, and stores the calibration file.

In the above step S1', the unique identification code, the calibration result and the calibration file of the detection device can be stored in the form of a table. Specifically, the step S1' includes the following steps:

S11': a blank table is created, wherein the table contains three pieces of information; the unique identification code, the calibration result and the calibration file.

S12': the calibration result and the unique identification code thereof of each detection device on the production line are correspondingly filled in the established table.

S13': the calibration file of the corresponding detection device is generated according to the received calibration result, and the generated calibration file is correspondingly filled in the above table.

Illustratively, the table stored in the address space accessible by the detection device in the use environment can be as shown in Table 1 below:

TABLE 1

| Unique identification code of the detection device | Calibration result | Calibration file |
|---|---|---|
| 2017350001 | Spectral data 1 | Calibration file 1 |
| 2017350002 | Spectral data 2 | Calibration file 2 |
| 2017350003 | Spectral data 3 | Calibration file 3 |
| . . . | . . . | . . . |

Wherein, the calibration result is illustrated by taking the spectral data acquired by the detection device by detecting the article as an example. Of course, the calibration result can also be other kinds of data.

It should be noted that, in the above step S1', the manner of generating the calibration file according to the calibration result can be automatically generated by a program according to a set rule and can also be manual generation. Wherein, the manual generation manner specifically refers to generating the calibration file manually according to a certain rule, it is taken as an example that the calibration result is spectral data, the manual generation manner is to observe the spectrum obtained by the detection by human eyes and to judge the distance between each peak in a spectral waveform and a standard value so as to generate the calibration file.

S1": on a user side, before the user detects the item using the detection device, the detection device first attempts to acquire its calibration file from itself. If the calibration file cannot be acquired, the process proceeds to step S2". If the calibration file can be acquired, the process proceeds to step S4".

In the above step S1", the process of acquiring its calibration file from the detection device itself can be: acquiring its calibration file from a fixed storage path in the detection device.

It should be noted that, generally, the detection application is installed in the detection device. When the user uses the detection device to detect the item, the detection application is first opened, so that the detection application starts initialization, and the acquisition process of the calibration file mentioned in this embodiment can be considered as an initialization process belonging to the detection application. Specifically, in this step, each time the detection application is initialized, the detection device will first try to acquire its calibration file from itself.

S2": on the user side, the detection device sends a calibration file acquisition request carrying the unique identification code of the detection device to the address space accessible by the detection device in the use environment.

In the above step S2", since the address space accessible by the detection device in the use environment has a feature that can be accessed by the external network, the above step S2" is implemented.

For the detection device in which the detection application program is installed, the action of the above step S2" is specifically implemented by the detection application program.

S2': on the network side, the address space accessible by the detection device in the use environment receives the calibration file acquisition request sent by the detection device and carrying the unique identification code thereof, the calibration file of the detection device is searched for according to the unique identification code, and the searched calibration file is returned to the detection device.

In the above step S2', since the address space accessible by the detection device in the use environment stores the unique identification code, the calibration result and the calibration file of each detection device correspondingly, after the address space accessible by the detection device in the use environment receives the calibration file acquisition request, which detection device needs to acquire the calibration file can be known according to the unique identification code carried in the detection device, and then the calibration file of the detection device can be acquired by searching the stored data.

It should be noted that, in view of the table storage manner, the calibration file corresponding to the unique identification code can be directly and quickly acquired by means of lookup table.

S3": on the user side, the detection device receives the calibration file returned by the address space accessible by the detection device in the use environment for the calibration file acquisition request, and step S4" is executed.

In the above step S3", after the detection device receives the calibration file returned by the address space accessible by the detection device in the use environment, the detection device can store the calibration file, when the detection device is used again to detect the substance, as long as the calibration file is not deleted by mistake, the calibration file can be acquired directly from the detection device itself, which is faster than the manner of obtaining the calibration file by accessing the address space accessible by the detection device in the use environment. The calibration file can be specifically stored in the following manner: the calibration file is stored in a fixed storage path in the detection device to facilitate the acquisition of the calibration file from the detection device itself when the detection device is used again to detect the substance.

In an actual implementation process of the step S3", the detection device cannot acquire the calibration file from the address space accessible by the detection device in the use environment due to network interruption, abnormality and other situations in this case, as a possible implementation manner, the step S3 specifically includes: monitoring in real time whether the detection device receives the calibration file returned by the address space accessible by the detection device in the use environment for the calibration file acquisition request within a set time length; if so, storing the calibration file, and entering step S4"; if not, returning to step S2".

S4": on the user side, the detection device loads the acquired calibration file.

After the loading of the calibration file is completed, the detection device can start the normal detection of the substance, so that after the detection is completed, the acquired detection result is compensated or calibrated correspondingly according to the loaded calibration file, thereby improving the accuracy and reliability of the detection result.

In the method for acquiring the calibration file of the detection device provided by the embodiment, the calibration file is acquired by combining the two ways of from the detection device itself and from the address space accessible by the detection device in the use environment, thereby ensuring that even if the calibration file in the detection device is deleted by mistake, the calibration file can be acquired, thus ensuring the normal use of the user, and improving the user experience and the reliability of the detection device.

Figure 3:
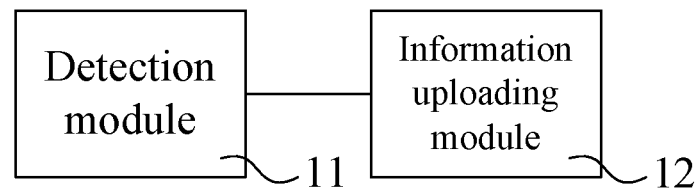
FIG. 3 is a structural block diagram of a calibration apparatus of a detection device provided by an embodiment of the present invention.

Based on the calibration method of the detection device and the method for acquiring the calibration file of the detection device as described above, the embodiment further provides the following apparatus:

(I) A calibration apparatus of the detection device used for calibrating the detection device on the production line, as shown in FIG. 3, the calibration apparatus includes: a detection module 11 and an information uploading module 12. The detection module 11 is used for detecting a standard operation of a standard article in a standard environment, and using the acquired detection result as a calibration result of the corresponding detection device. The information uploading module 12 is used for binding the calibration result with a unique identification code of the corresponding detection device and uploading the same to an address space accessible by the detection device in a use environment.

For the specific working process of the above calibration apparatus, reference can be made to the description of the calibration method of the detection device, and thus it will not be repeated herein.

As the calibration apparatus is used for calibrating the detection device on the production line, the operation of separately burning the calibration file into each detection device is avoided, thereby greatly shortening the production time of the production line and improving the production efficiency.

A storage medium is provided, wherein the storage medium stores instruction codes, and the instruction codes are used for executing the calibration method in the present embodiment.

The beneficial effects capable of being generated by above storage medium are the same as those of the calibration method described in the present embodiment, and thus are not repeated herein.

A computer program is provided, wherein the computer program includes instruction codes, and the instruction codes are used for executing the calibration method in the present embodiment.

The beneficial effects capable of being generated by above computer program are the same as those of the calibration method described in the present embodiment, and thus are not repeated herein.

Figure 4:
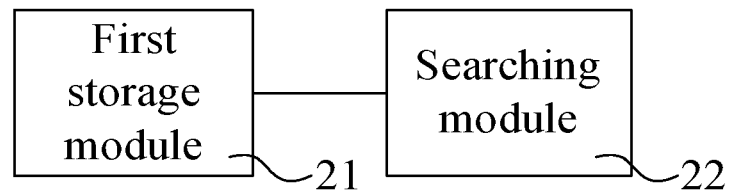
FIG. 4 is a structural block diagram of a network side apparatus for acquiring a calibration file of a detection device provided by an embodiment of the present invention.

(II) A network side apparatus for acquiring the calibration file of the detection device, as shown in FIG. 4, the network side apparatus includes first storage module 21 and a searching module 22. The first storage module 21 is used for receiving and storing a calibration result of each detection device on a production line and a unique identification code thereof, generating a calibration file of the corresponding detection device according to the calibration result, and storing the calibration file. The searching module 22 is used for receiving a calibration file acquisition request sent by the detection device and carrying the unique identification code thereof, searching for the calibration file of the detection device according to the unique identification code, and returning the searched calibration file to the detection device.

For the specific working process of the above network side apparatus, reference can be made to the description of the network side flows of the method for acquiring the calibration file of the detection device, and thus it will not be repeated herein.

As the network side apparatus participates in the acquisition of the calibration file of the detection device, it can be ensured that even if the calibration file in the detection device is deleted by mistake, the calibration file can be acquired, thereby ensuring the normal use of the user.

A storage medium is provided, wherein the storage medium stores instruction codes, and the instruction codes are used for executing the network side flows of the acquisition method in the present embodiment.

The beneficial effects capable of being generated by above storage medium are the same as those of the acquisition method described in the present embodiment, and thus are not repeated herein.

A computer program is provided, wherein the computer program includes instruction codes, and the instruction codes are used for executing the network side flows of the acquisition method in the present embodiment.

The beneficial effects capable of being generated by above computer program are the same as those of the acquisition method described in the present embodiment, and thus are not repeated herein.

Figure 5:
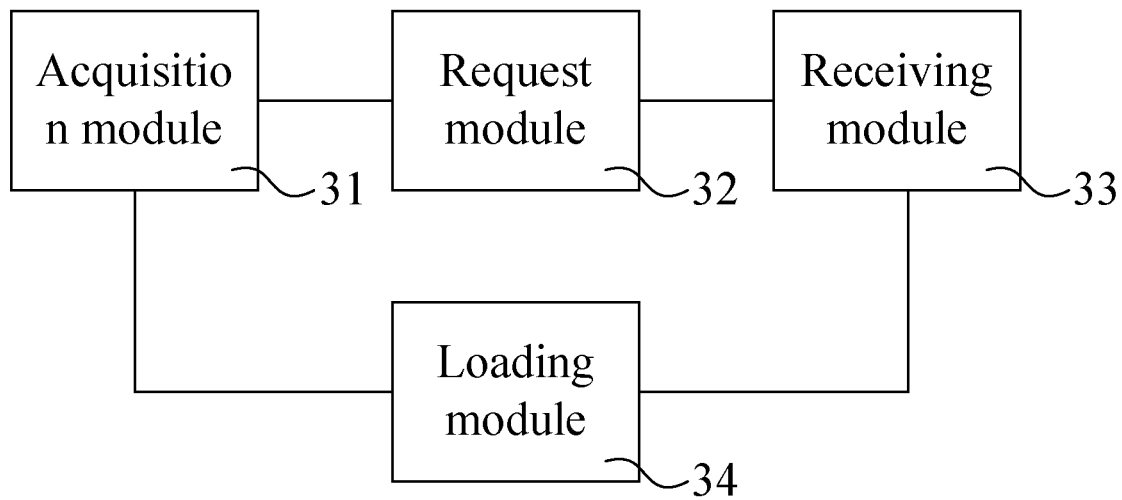
FIG. 5 is a structural block diagram of a user side apparatus for acquiring a calibration file of a detection device provided by an embodiment of the present invention.

(III) A user side apparatus for acquiring the calibration file of the detection device, as shown in FIG. 5, the user side apparatus includes: an acquisition module 31, a request module 32, a receiving module 33, and a loading module 34. The acquisition module 31 is used for attempting to acquire a calibration file thereof from the detection device before detecting the article. The request module 32 is used for, when the acquisition module 31 cannot acquire the calibration file from the detection device, sending a calibration file acquisition request carrying a unique identification code of the detection device to an address space accessible by the detection device in a use environment. The receiving module 33 is used for receiving the calibration file returned by the address space accessible by the detection device in the use environment for the calibration file acquisition request. The loading module 34 is used for loading the calibration file.

For the specific working process def the above user side apparatus, reference can be made to the description of the user side flows of the method for acquiring the calibration file of the detection device, and thus it will not be repeated herein.

As the user side apparatus participates in the acquisition of the calibration file of the detection device, it can be ensured that even if the calibration file in the detection device is deleted by mistake, the calibration file can be acquired, thereby ensuring the normal use of the user.

As a possible implementation manner, the user side apparatus can further include: a second storage module, used for storing the calibration file, so that when the detection device is used for detecting the substance again, the calibration file can be quickly acquired from the detection device itself.

A detection device is provided, wherein the detection device includes the user side apparatus in the present embodiment.

The beneficial effects capable of being generated by above detection device are the same as those of the acquisition method described in the present embodiment, and thus are not repeated herein.

A storage medium is provided, wherein the storage medium stores instruction codes, and the instruction codes are used for executing the user side flows of the acquisition method in the present embodiment.

The beneficial effects capable of being generated by above storage medium are the same as those of the acquisition method described in the present embodiment, and thus are not repeated herein.

A computer program is provided, wherein the computer program includes instruction codes, and the instruction codes are used for executing the user side flows of the acquisition method in the present embodiment.

The beneficial effects capable of being generated by above computer program are the same as those of the acquisition method described in the present embodiment, and thus are not repeated herein.

The above descriptions are only specific embodiments of the present invention, but the protection scope of the present invention is not limited thereto, and any modifications and substitutions easily thought of by any person skilled in the art should fall within the protection scope of the present invention. Therefore, the protection scope of the present invention should be determined by the protection scope of the claims.

The invention claimed is:

1. A method for acquiring a calibration file of a detection device, comprising:
   S1': receiving and storing a calibration result of each detection device on a production line and a unique identification code thereof, generating a calibration file of the corresponding detection device according to the calibration result, and storing the calibration file,
      establishing a blank table, wherein the table contains three pieces of information: the unique identification code, the calibration result and the calibration file,
      filling the calibration result and the unique identification code thereof of each detection device on the production line in the established table correspondingly, and
      generating the calibration file of the corresponding detection device according to the calibration result, and filing the calibration file in the table correspondingly; and
   S2': receiving a calibration file acquisition request sent by the detection device and carrying the unique identification code thereof, searching for the calibration file of the detection device according to the unique identification code, and returning the searched calibration file to the detection device.

2. A method for acquiring a calibration file of a detection device, comprising:
   S1": attempting to acquire a calibration file thereof from the detection device before detecting the article, if the calibration file cannot be acquired, entering step S2"; if the calibration file can be acquired, entering step S4";
   S2": sending a calibration file acquisition request carrying a unique identification code of the detection device to an address space accessible by the detection device in a use environment;
   S3": receiving the calibration file returned by the address space for the calibration file acquisition request, and entering step S4", and
      storing the calibration file; and
   S4": loading the calibration file,
   wherein:
      in the step S1", the acquiring the calibration file thereof from the detection device comprises: acquiring the calibration file thereof from a fixed storage path of the detection device; and
      in the step S3", storing the calibration file comprises: storing the calibration file on the fixed storage path in the detection device.

3. A method for acquiring a calibration file of a detection device, comprising:
   S1": attempting to acquire a calibration file thereof from the detection device before detecting the article, if the calibration file cannot be acquired, entering step S2"; if the calibration file can be acquired, entering step S4";
   S2": sending a calibration file acquisition request carrying a unique identification code of the detection device to an address space accessible by the detection device in a use environment;
   S3": receiving the calibration file returned by the address space for the calibration file acquisition request, and entering step S4"; and
   S4": loading the calibration file.

4. The acquisition method according to claim 3, wherein the step S3" comprises:
   monitoring in real time whether the calibration file returned by the address space for the calibration file acquisition request within a set time length is received; if so, storing the calibration file, and entering step S4"; and if not, returning to step S2".

5. A storage medium, wherein the storage medium stores instruction codes, and the instruction codes are used for executing the acquisition method according to claim 3.

\* \* \* \* \*